United States Patent
Page et al.

(10) Patent No.: US 11,926,410 B2
(45) Date of Patent: Mar. 12, 2024

(54) DRAG RECOVERY SCHEME FOR NACELLES

(71) Applicant: Blended Wing Aircraft, Inc., Orange, CA (US)

(72) Inventors: Mark A. Page, Cypress, CA (US); John Winkler, San Clemente, CA (US); Brendan Kennelly, Fullerton, CA (US)

(73) Assignee: JetZero, Inc., Long Beach, CA (US)

( * ) Notice: Subject to any disclaimer, the term of this patent is extended or adjusted under 35 U.S.C. 154(b) by 428 days.

(21) Appl. No.: 16/726,542

(22) Filed: Dec. 24, 2019

(65) Prior Publication Data

US 2020/0331591 A1    Oct. 22, 2020

Related U.S. Application Data

(60) Provisional application No. 62/786,589, filed on Dec. 31, 2018.

(51) Int. Cl.
| | | |
|---|---|---|
| *B64C 21/06* | (2023.01) | |
| *B64C 1/16* | (2006.01) | |
| *B64C 39/10* | (2006.01) | |
| *B64D 27/02* | (2006.01) | |
| *B64D 27/14* | (2006.01) | |
| *B64D 27/20* | (2006.01) | |
| *B64D 27/24* | (2006.01) | |

(52) U.S. Cl.
CPC ........... *B64C 21/06* (2013.01); *B64C 1/16* (2013.01); *B64D 27/14* (2013.01); *B64D 27/20* (2013.01); *B64D 27/24* (2013.01); *B64C 39/10* (2013.01); *B64C 2039/105* (2013.01); *B64D 2027/026* (2013.01)

(58) Field of Classification Search
CPC .... B64C 21/06; B64C 39/10; B64C 2039/105
See application file for complete search history.

(56) References Cited

U.S. PATENT DOCUMENTS

| | | | | |
|---|---|---|---|---|
| 2,405,907 A | * | 8/1946 | Schmitt | B64C 39/10 89/37.16 |
| 2,619,795 A | | 12/1952 | Drake | |
| 3,188,025 A | * | 6/1965 | Moorehead | B64D 27/20 244/55 |
| 3,216,673 A | * | 11/1965 | Alter | B60V 1/08 244/102 R |
| 3,244,246 A | * | 4/1966 | Weiland | B60V 1/22 244/23 B |

(Continued)

OTHER PUBLICATIONS

International Search Report and Written Opinion dated Mar. 24, 2020 for PCT Application No. PCT/US2019/068484, 8 pages.

*Primary Examiner* — Joshua J Michener
*Assistant Examiner* — Colin Zohoori
(74) *Attorney, Agent, or Firm* — Caldwell Intellectual Property Law

(57) ABSTRACT

Technologies are described herein for a drag recovery scheme. In various examples, a recovery engine is placed within a vortex flow of air caused by the impingement of air upon a nacelle of a main engine. The propeller of the recovery engine can use the vortex flow of air to provide additional thrust the aircraft, thus reducing the load on the main engines or providing an increased velocity.

12 Claims, 4 Drawing Sheets

(56) References Cited

U.S. PATENT DOCUMENTS

| | | | |
|---|---|---|---|
| 3,869,102 A * | 3/1975 | Carroll | B64C 39/02 |
| | | | 244/119 |
| 5,115,996 A * | 5/1992 | Moller | B64C 29/0025 |
| | | | D12/326 |
| 6,394,392 B1 * | 5/2002 | Lafferty | B64C 1/1415 |
| | | | 244/118.1 |
| 7,752,834 B2 | 7/2010 | Addis | |
| 9,540,113 B2 | 1/2017 | Gukeisen | |
| 9,650,954 B2 * | 5/2017 | Suciu | F02C 3/06 |
| 10,850,859 B2 * | 12/2020 | Lemarchand | B64C 3/32 |
| 11,111,029 B2 * | 9/2021 | Hoisington | B64D 27/20 |
| 2010/0108802 A1 * | 5/2010 | Marche | B64F 5/50 |
| | | | 244/54 |
| 2013/0101392 A1 * | 4/2013 | Rebhi | B64D 27/02 |
| | | | 415/62 |
| 2016/0010589 A1 | 1/2016 | Rolt | |
| 2016/0176533 A1 | 6/2016 | Cazals et al. | |
| 2017/0037779 A1 | 2/2017 | Khalid | |
| 2020/0010188 A1 * | 1/2020 | Fauri | B64C 3/546 |
| 2020/0216182 A1 * | 7/2020 | Negulescu | B64D 27/18 |

* cited by examiner

DRAG RECOVERY SCHEME FOR NACELLES

CROSS REFERENCE TO RELATED APPLICATIONS

This application claims the benefit of U.S. Provisional Application No. 62/786,589 filed Dec. 31, 2018, which is incorporated herein by reference in its entirety.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially percentage of the available volume of the fuselage to be utilized.

While convenient from a packaging standpoint, the tube and wing configuration is not particularly efficient. This is because the fuselage provides little or no lift, yet introduces substantial drag. Thus, the wing must provide substantially all of the lift required for the aircraft to fly. This configuration requires a wing that is larger, thicker, and/or more cambered than would otherwise be required (i.e., if the fuselage provided a larger percentage of the required lift). This results in a wing with higher lift, but proportionately higher drag. Thus, the engines must provide enough thrust to overcome the drag from both the fuselage and the (now higher drag) wing.

In a blended wing configuration, on the other hand, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

It is with respect to these and other considerations that the disclosure made herein is presented.

SUMMARY

Technologies are described herein for a drag recovery scheme. In some examples, a blended wing body (BWB) aircraft has one or more main engines, one or more of the engines housed in nacelles. In some examples, the nacelles abut a top surface of the aircraft. In other examples, the nacelles are partially within the aircraft and partially outside of the aircraft ("partially hidden"). The BWB aircraft further comprises one or more rear facing ("pusher configuration"), or forward facing in some configurations, electric propeller, gasoline propeller, turbine, or turboprop engine ("recovery engine") to provide additional thrust.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for a drag recovery scheme. As noted above, in some examples, a BWB aircraft can include one or more nacelles that house a jet engine. In some examples, the nacelles abut (or are installed onto) a top surface of the aircraft. In other examples, the nacelles are partially within the aircraft and partially outside of the aircraft ("partially hidden"). Partially hidden means that that the nacelles are partially below the surface of the aircraft.

When the BWB aircraft is moving through the air at some velocity through the use of the one or more jet engines ("main engines"), an impingement area at the front end of the nacelle forms. The impingement area is an area in which the air that is not drawn into the jet engine is affected by the front surface of the nacelle. Through the interaction of the air in the impingement area, the velocity of the air slows down. The now slower moving secondary air streams, at a velocity that can be significantly less than the velocity of the air entering the main engine, can start to form mini-vortexes of air that travel aftward from the impingement area along an area proximate to the surface of the BWB. In conventional technologies, the relatively slow moving secondary air stream travels along the BWB aircraft and exits from the aft of the BWB aircraft.

In some examples, instead of allowing the secondary air stream to merely re-enter the air aft of the BWB aircraft, various examples of the presently disclosed subject matter use a recovery engine to utilize the relatively slow-moving air to provide additional thrust. Because of the relatively slower speed, propeller-based engines such as an electric propeller, gasoline propeller, turbine, or turboprop engine, can be used to provide additional thrust. In other examples, the recovery engine can be an additional turbojet engine that is an auxiliary engine to the main engines.

While the presently disclosed subject matter may be described with respect to what is termed as examples, embodiments, and the like, it is understood that the presently disclosed system is not limited to the disclosed embodiments.

Furthermore, it is understood that this invention is not limited to the particular methodology, materials, and modifications described and as such may, of course, vary. It is also understood that the terminology used herein is for the purpose of describing particular embodiments only, and is not intended to limit the scope of the present invention. Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
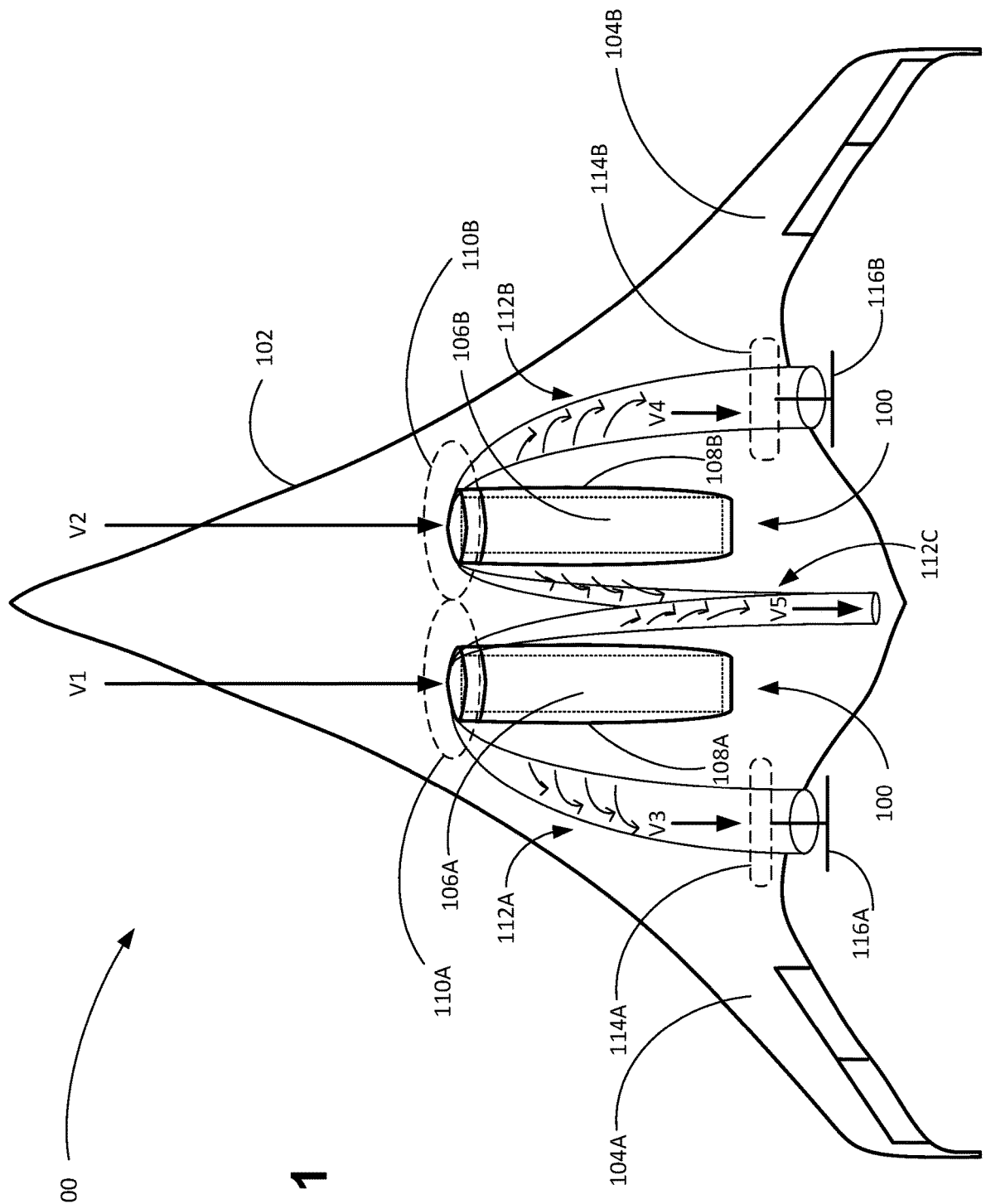
FIG. 1 is a top-down illustration of a blended wing body ("BWB") aircraft, according to various examples described herein.

FIG. 1 is a top-down illustration of a blended wing body ("BWB") aircraft 100, according to various examples described herein. The BWB aircraft includes a fuselage 102. The fuselage includes a port wing 104A and a starboard wing 104B. To provide a first thrust and propel the aircraft 100 through the air, the aircraft includes main engine 106A housed within nacelle 108A and main engine 106B housed within nacelle 108B. The main engines 106A and/or 106B may be various types of engines, including, but not limited to, turbojet, turboprop, turbofan, and turboshaft. As used herein, the nacelle 108A and 108B are housings, separate from the fuselage 102, that holds the main engines 106A and 106B, respectively. It should be noted that although the presently disclosed subject matter is described in terms of a two-engine BWB aircraft, aircraft 100, examples of the presently disclosed subject matter may be used with other numbers of main engines, or other equipment, and are considered to be within the scope of the presently disclosed subject matter.

The aircraft in FIG. 1 is illustrated in terms of flows experienced during flight operations. For example, when in flight, the air entering the main engines 106A and 106B are illustrated as air vectors V1 and V2. It is noted that although air vectors V1 and V2 are shown having a direction parallel to the direction of flight of the aircraft 100, there may be other flows and directions of air, the presently disclosed subject matter not being limited to completely parallel or linear flow of air, as the vectors are illustrative only.

During flight, when air traveling along air vectors V1 and V2 approach the nacelles 108A and 108B, the air enters an impingement area 110A in front of nacelle 108A and/or an impingement area 110B in front of nacelle 108B. The impingement areas 110A and 110B are areas in which the air is slowed down, and its direction diverted due to the action the air hitting the nacelles 108A and 108B. Although not all the air that enters the impingement areas 110A and/or 110B impinges upon a surface of the nacelles 108A and 108B, the air may be affected by other air proximate to or that has impinged upon a surface of the nacelles 108A and 108B.

Because of the forward movement of the aircraft 100, some of the air leaving the impingement areas 110A and/or 110B form secondary air stream 112A, coming from the nacelle 108A, secondary airstream 112B, coming from the nacelle 108B, and secondary airstream 112C, coming from the nacelles 108A and 108B. In some examples, the secondary airstreams 112A-112C move aft along the fuselage 102, and in some examples, form vortex streams of air, though the presently disclosed subject matter is not limited to any particular type of airstream. In some examples, the nacelle 108A and/or the nacelle 108B can include a bump diverter or diverter as understood in conventional technologies.

Engine inlets in close proximity to a fuselage or wing surface are known to have two integration effects. The first is a distorted intake flow caused by frictional losses on the adjoining wing or body entering the inlet which causes blade stall and vibration of turbine engines. The second is the intake bow-wave effect where the inlets compression field is radiated forward that may cause the boundary layer of the adjoining surface to bunch up, separate, and splay into 2 vertical streams of low energy air. The second effect may be a strategy to solve the first issue, but the second effect comes at an expense to drag since large vortices are created. In conventional technologies, inlets either divert the low energy air approaching the inlet with a diverter plate or bump diverter. Both create drag in the process of protecting the inlet and engine.

The drag of a bump diverter and/or diverter can be recovered more efficiently than other forms of drag by wake filling and vortex swirl recovery by using recovery engines, as described in more detail, below. The two streams of spinning low-energy air can be harvested with wake filling fans. The fans can be exposed propellers centered on the wake vortices and rotating counter to those vortices. The thrust produced by these fans may be more efficient than engine thrust by virtue of the low ram drag and swirl recovery. Such a fan of a recovery engine may benefit from the inlets role in concentrating the viscous losses of a wide swath of the adjoining surface into a roughly round pool that is east to harvest with a spinning prop in this low Mach flow. The harvest thrust allows the main engines to operate at a lower thrust level. The losses between the engine offtake power and electric motor power in the wake-fan is offset by the much larger energy benefit of very low ram drag.

For example, due to the interaction of the air within the secondary airstreams 112A-112C in the impingement areas 110A and/or 110B, the velocity of the secondary airstream 112A, V3, may be less than the V1 and/or V2. In a similar manner, the velocity of the secondary airstream 112B, V4, and the velocity of the secondary airstream 112C, V5, may be less than the V1 and/or V2. In conventional systems, these lower velocity airstreams move along the fuselage of the conventional aircraft and reenter the airstream aft of the fuselage.

However, in some examples, the velocities V3, V4, and/or V5 may be appreciably less than the V1 or V2 so that the use of a recovery engine. As used herein, a recovery engine is an engine placed within a secondary airstream, or whose air intake during operation would be partially or substantial provided by a secondary airstream. A purpose of a recovery engine, according to various examples provided herein, is to recover lost energy caused by the slowing down of the air and provide additional thrust to the aircraft. In some examples, a propeller-type of engine, such as a turbo-prop engine, may operate more efficiently in air having a lower velocity than air at a higher velocity, though the presently disclosed subject matter is not limited to any particular type of recovery engine.

As illustrated in FIG. 1, the aircraft 100 includes recovery engine 114A having propeller 116A and recovery engine 114B having propeller 116B. The propellers 116A and 116B may be located in an area in which the air the propellers 116 and/or 116B are acting upon is partially or wholly the secondary airstreams 112A and 112B, respectively. The propellers 116A and 116B are rotated by recovery engine 114A and 114B, respectively. In some examples, the recovery engine 114A and 114B may be partially or completely disposed within the fuselage 102, described in more detail in the following figures. As illustrated, a recovery engine is not placed within the secondary airstream 112C, illustrating an example in which a recovery engine is not placed in every secondary airstream.

Figure 2:
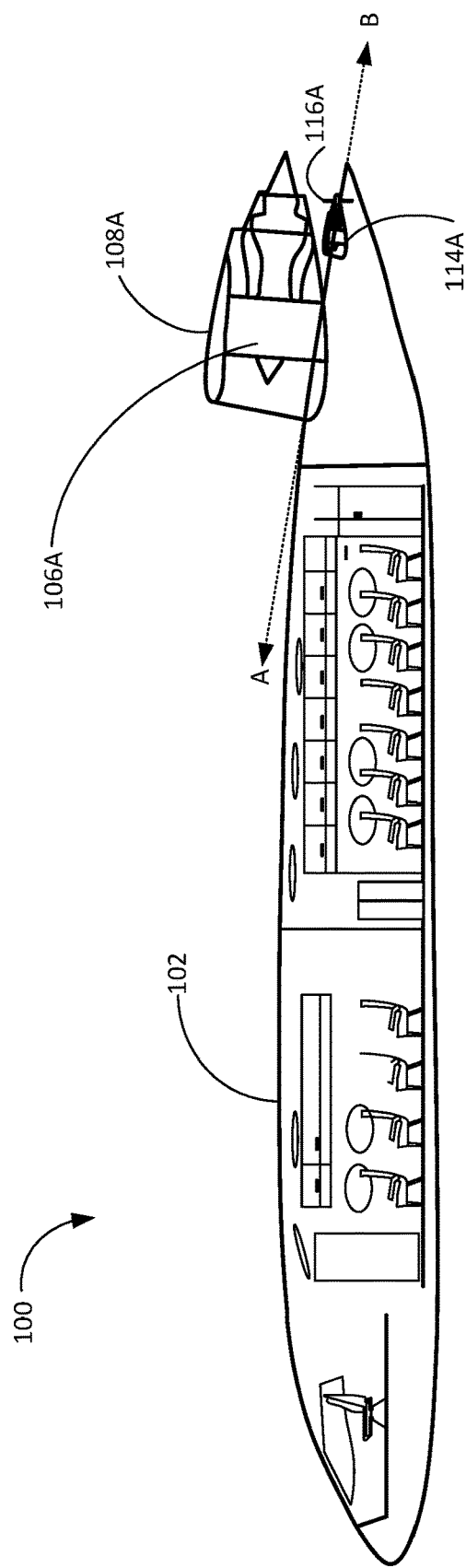
FIG. 2 is a side-view illustration of a BWB having semi-buried nacelles, according to various examples described herein.

FIG. 2 is a side view of the aircraft 100. In FIG. 2, the fuselage 102 is illustrated with the main engine 106A and the recovery engine 114A and propeller 116A. As illustrated, a part of the nacelle 108A of the main engine 106A is partially below a surface plane AB of the fuselage 102, sometimes referred to as a "partially-buried" or "semi-buried" nacelle. In the example illustrated in FIG. 2, the recovery engine 114A is also partially-buried or semi-buried. It should be understood that this is merely an example, as the presently disclosed subject matter may be used with fully or non-buried nacelles/engines.

Figure 3:
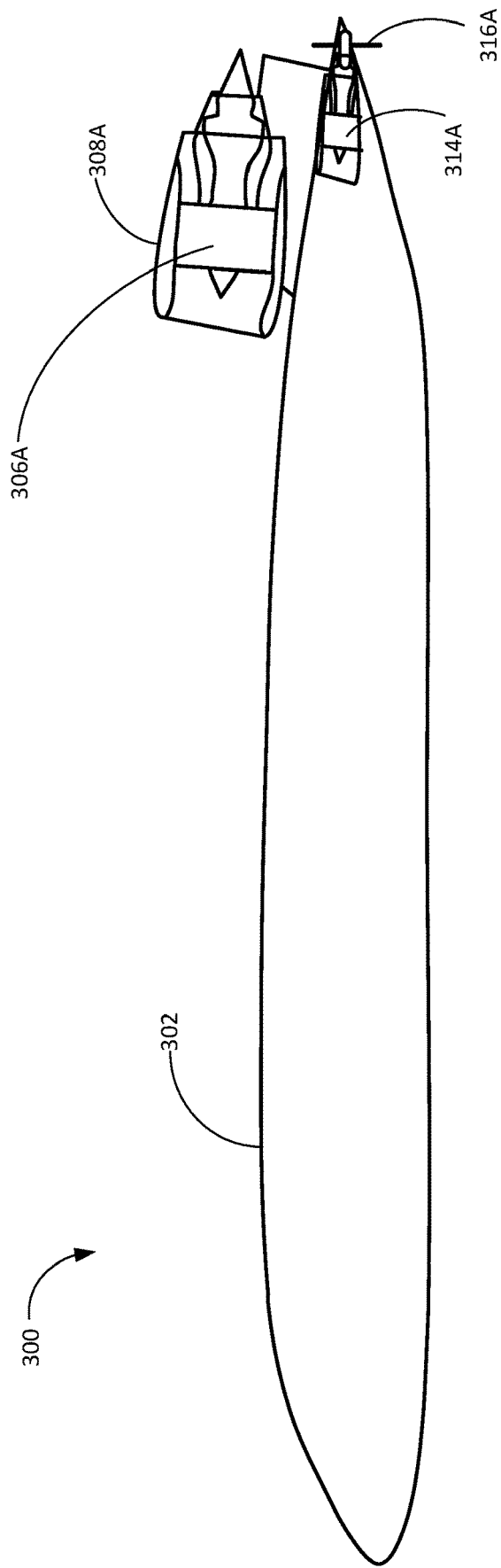
FIG. 3 is a side-view illustration of a BWB having non-buried nacelles, according to various examples described herein.

FIG. 3 illustrates a non-buried nacelle configuration. In FIG. 3, an aircraft 300 includes a fuselage 302. The aircraft 300 includes a main engine 306A housed within a nacelle 308A. As illustrated, the nacelle 108A of the main engine 106A is above the fuselage 302. In the example illustrated in FIG. 3, the recovery engine 314A is partially-buried or semi-buried.

Figure 4:
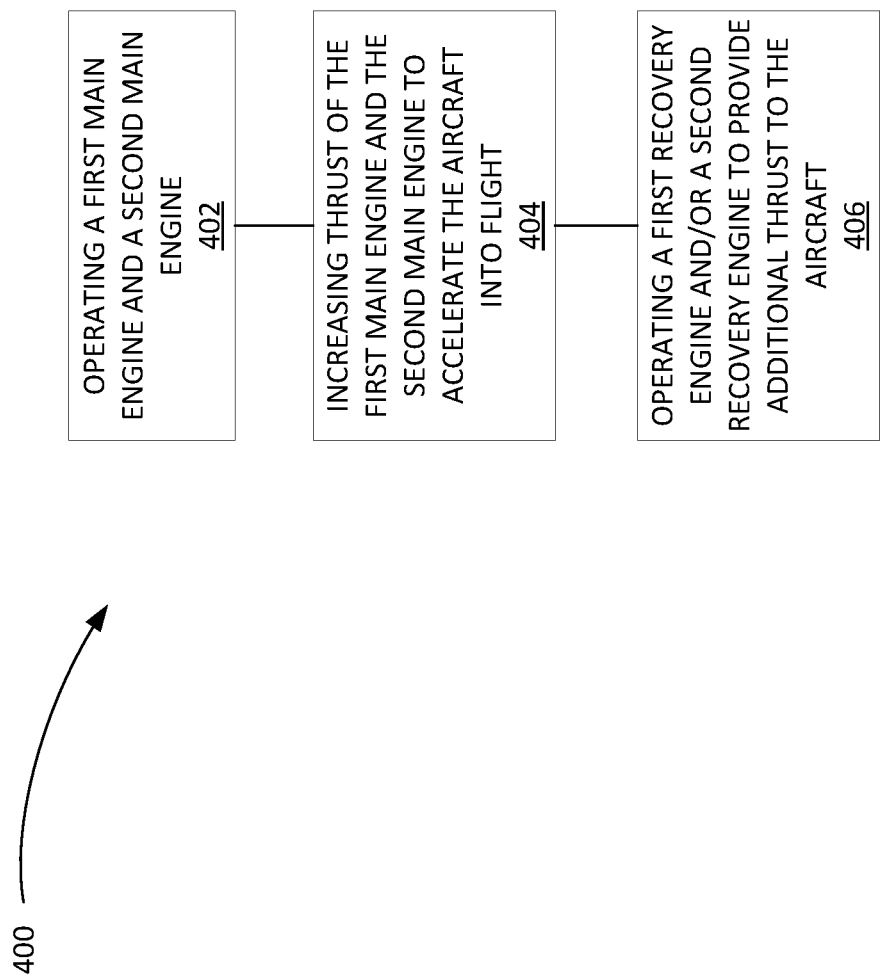
FIG. 4 illustrates a process for operating an aircraft, according to various examples described herein.

FIG. 4 illustrates a process 400 for operating the aircraft 100. The process 400 and other processes described herein are illustrated as example flow graphs. The order in which the operations are described is not intended to be construed as a limitation, and any number of the described operations can be combined in any order and/or in parallel to implement the processes.

The process 400 commences at operation 402, where the first main engine 106A and/or the second main engine 106B are operated for flight.

The process 400 continues to operation 404, where thrust component of the first main engine 106A and/or the second main engine 106B are increased to cause the aircraft 100 to enter into a flight mode off the ground.

The process 400 continues to operation 406, where the first recovery engine 114A and/or the second recovery engine 116B is operated to provide an additional thrust component to the aircraft 100. The first recovery engine 114A and/or the second recovery engine 114B may be operated prior to the aircraft 100 entering into the flight mode or at any subsequent time thereafter.

Based on the foregoing, it should be appreciated that technologies for a drag recovery scheme for nacelles have been disclosed herein. It is to be understood that the invention defined in the appended claims is not necessarily limited to the specific features or acts described herein. Rather, the specific features or acts are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, aspects of which are set forth in the following claims.

What is claimed is:

1. An aircraft, comprising:
a fuselage comprising a plurality of fixed wings, a nose, and a rear;
a blended wing body comprising a continuous curvilinear geometry between each wing of the plurality of fixed wings and the nose of the aircraft;
at least one main engine housed within a nacelle, wherein the nacelle is disposed on a top portion of the fuselage, the at least one main engine configured to provide a first thrust component to the aircraft in a first airstream having a first velocity, wherein the at least one main engine comprises a forward end and an aft end;
an impingement area located at the front end of the nacelle, wherein the impingement area is configured to generate a second airstream vortex as a function of the first airstream interacting with the impingement area;
at least one recovery engine to provide a second thrust component to the aircraft in the second airstream vortex having a second velocity less than the first velocity, wherein the at least one recovery engine is fully disposed below the surface of the fuselage, wherein the at least one recovery engine has a forward end and an aft end, wherein the forward end of the at least one recovery engine is located between the aft end of the at least one main engine and the rear of the fuselage.

2. The aircraft of claim 1, wherein the recovery engine comprises a propeller-based engine.

3. The aircraft of claim 1, wherein the recovery engine comprises an electric propeller engine, a gasoline propeller engine, a turbine propeller engine, or a turbine engine.

4. The aircraft of claim 1, wherein the nacelle is partially hidden within the fuselage.

5. The aircraft of claim 1, further comprising:
a second main engine housed within a second nacelle, the second main engine configured to provide a third thrust component to the aircraft in a third airstream having a third velocity; and
a second recovery engine to provide a fourth thrust component to the aircraft in a fourth airstream having a fourth velocity, wherein the fourth airstream comprises a portion of air in the third airstream, wherein the fourth velocity is less than the first velocity or the third velocity.

6. The aircraft of claim 5, wherein a portion of the second nacelle proximal to the second main engine is configured to divert a portion of air in the third airstream around the second nacelle and into a combined airstream.

7. A method of operating an aircraft, the method comprising:
providing a first thrust component to the aircraft by operating a first main engine in a first airstream, the first main engine housed within a first nacelle disposed on a top portion of a fuselage of the aircraft, wherein the first main engine has a forward end and an aft end, wherein the aircraft comprises:
a fuselage comprising a plurality of fixed wings, a nose, and a rear; and
a blended wing body comprising a continuous curvilinear geometry between each wing of the plurality of fixed wings and the nose of the aircraft;
diverting a portion of the first airstream into a second airstream vortex using an impingement area, wherein the impingement area is located at the front end of the nacelle; and
providing a second thrust component to the aircraft by operating a first recovery engine in the second airstream vortex having a second velocity less than the first velocity, wherein the first recovery engine has a forward end and an aft end, and the forward end of the first recovery engine is located between the aft end of the first main engine and the rear of the fuselage, wherein the first recovery engine is fully disposed below the surface of the fuselage.

8. The method of claim 7, further comprising:
providing a third thrust component to the aircraft by operating a second main engine housed within a second nacelle, the second main engine configured to provide the third thrust component to the aircraft in a third airstream having a third velocity; and
providing a fourth thrust component to the aircraft by operating a second recovery engine to provide the fourth thrust component to the aircraft in a fourth airstream having a fourth velocity, wherein the fourth airstream comprises a portion of air in the third airstream, wherein the fourth velocity is less than the first velocity or the third velocity.

9. The method of claim 7, wherein the first recovery engine comprises a propeller-based engine.

10. The method of claim 7, wherein the first recovery engine comprises an electric propeller engine, a gasoline propeller engine, a turbine propeller engine, or a turbine engine.

11. The method of claim 7, wherein the first nacelle is partially hidden within the fuselage.

12. The method of claim 8, wherein the method further comprises diverting, by a portion of the second nacelle proximal to the second main engine, a portion of air in the third airstream around the second nacelle and into a combined airstream.

* * * * *